(12) United States Patent  (10) Patent No.: US 7,791,776 B2
Nielsen et al.  (45) Date of Patent: Sep. 7, 2010

(54) SPOT COLOR ADJUSTER

(75) Inventors: Mary Nielsen, Boise, ID (US); Robert D. Walton, Santa Ana, CA (US); Orhan E. Beckman, Vancouver, WA (US); Timothy E. Stefl, Saugus, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1254 days.

(21) Appl. No.: 11/261,090

(22) Filed: Oct. 28, 2005

(65) Prior Publication Data

US 2007/0097464 A1    May 3, 2007

(51) Int. Cl.
*G03F 3/08* (2006.01)
*G06K 9/00* (2006.01)

(52) U.S. Cl. .................. 358/518; 358/1.9; 382/162; 382/167

(58) Field of Classification Search .............. 358/518, 358/1.9; 345/102, 660; 399/46; 382/162, 382/167
See application file for complete search history.

(56) References Cited

U.S. PATENT DOCUMENTS

| | | | |
|---|---|---|---|
| 5,363,318 A | 11/1994 | McCauley | |
| 5,563,724 A | 10/1996 | Boll et al. | |
| 5,687,300 A | 11/1997 | Cooper | |
| 5,734,800 A | 3/1998 | Herbert et al. | |
| 5,751,326 A | 5/1998 | Bernasconi | |
| 6,081,343 A * | 6/2000 | Terashita | 358/1.9 |
| 6,321,043 B1 * | 11/2001 | Grace | 399/46 |
| 6,340,975 B2 | 1/2002 | Marsden et al. | |
| 6,611,249 B1 * | 8/2003 | Evanicky et al. | 345/102 |
| 7,009,626 B2 * | 3/2006 | Anwar | 345/660 |
| 7,164,498 B2 * | 1/2007 | Van Bael | 358/1.9 |
| 7,408,673 B1 * | 8/2008 | Chinn et al. | 358/1.9 |
| 2003/0132984 A1 | 7/2003 | Maltz | |
| 2003/0234943 A1 | 12/2003 | Van Bael | |
| 2004/0223172 A1 | 11/2004 | Yoshizawa et al. | |
| 2005/0150411 A1 | 7/2005 | Bestmann | |
| 2006/0098233 A1 * | 5/2006 | Jodra et al. | 358/3.26 |
| 2007/0002343 A1 * | 1/2007 | Butterfield et al. | 358/1.9 |
| 2007/0097464 A1 * | 5/2007 | Nielsen et al. | 358/518 |
| 2008/0291480 A1 * | 11/2008 | Mestha et al. | 358/1.9 |

FOREIGN PATENT DOCUMENTS

WO   WO 02/071739 A1   9/2002
WO   WO 2005/013603 A1   2/2005

* cited by examiner

*Primary Examiner*—Charlotte M Baker

(57) ABSTRACT

A method is provided for adjusting color output in a digital press. The method comprises providing a digital press including a output color ink array configured to print a first spot color element on a media and including an input color array including a process color subarray and at least one custom color input. The first spot color element is printed on the media from the digital press via a spot color simulation of the at least one custom color input using the output color ink array. The first spot color element is adjusted by modifying, at the digital press, the at least one custom color input without adjusting the process color subarray of the input color array.

20 Claims, 5 Drawing Sheets

SPOT COLOR ADJUSTER

BACKGROUND

Process color printing has created enormous flexibility and versatility in replicating color systems, such as the Pantone® Matching System and other color systems which provide a library of universally recognized spot colors. A spot color is commonly used to specify a particular color for printing an element on a media, such as a graphic logo, text or a raster images. Spot colors are often produced using custom inks, but a more economical solution is to simulate the spot colors using tint combinations of process inks. In one example, using a six color ink array, a process color mechanism in a digital press can simulate a substantial majority of the spot colors represented by the Pantone® Matching System. However, a variety of factors including the type of media on which the colors are printed, the particular brand or type of process inks (e.g., cyan ink, magenta ink, a custom ink, etc.), and other factors impair an accurate simulation of the spot color by the digital press.

Conventional methods of adjusting the output of a spot color on a printed media include making adjustments to the spot color definition of a raster, text or graphic element prior to submitting a digital file to a digital press. Other conventional adjustment techniques include making an adjustment at the digital press to the output of one or more process color inks, such as cyan ink, magenta ink, yellow ink, black ink, or a custom ink. Unfortunately, adjusting an output of a spot color by adjusting the process color ink affects the printing of both the spot color elements (simulated by the process color inks) and non-spot process color elements formed by the individual process color inks. Accordingly, an improvement in the output of a spot color often comes at the cost of degrading the output of the non-spot colors.

SUMMARY

Embodiments of the invention are directed to adjusting color output in digital printing. One embodiment of the invention is directed to a method for adjusting color output in a digital press. The method comprises providing a digital press including an output color ink array configured to print a spot color element on a media and including an input color array including an input process color array and at least one custom color input. The spot color elements are printed on the media from the digital press via a spot color simulation using the output process color ink array. The spot color element is adjusted by modifying, at the digital press, the at least one custom color input without adjusting the input process color array of the input color array.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention are directed to adjusting spot color inputs separate from process color inputs for a digital press. These embodiments enable optimizing a simulation of a spot color, such as one of the spot colors of a color system (e.g., the Pantone® Matching System), without corrupting accurate printing of a process color element on the same printed media. Being able to focus adjustments on the spot colors, without degrading process color elements, gives a digital press operator more latitude in perfecting the simulation of the spot color. This feature enhances the versatility of a digital press because it increases the probability that a six ink or four ink (or any n-ink) set of process colors will be able to accurately simulate a spot color.

These embodiments of the invention, and additional embodiments of the invention, are described and illustrated throughout FIGS. 1-7.

Figure 1:
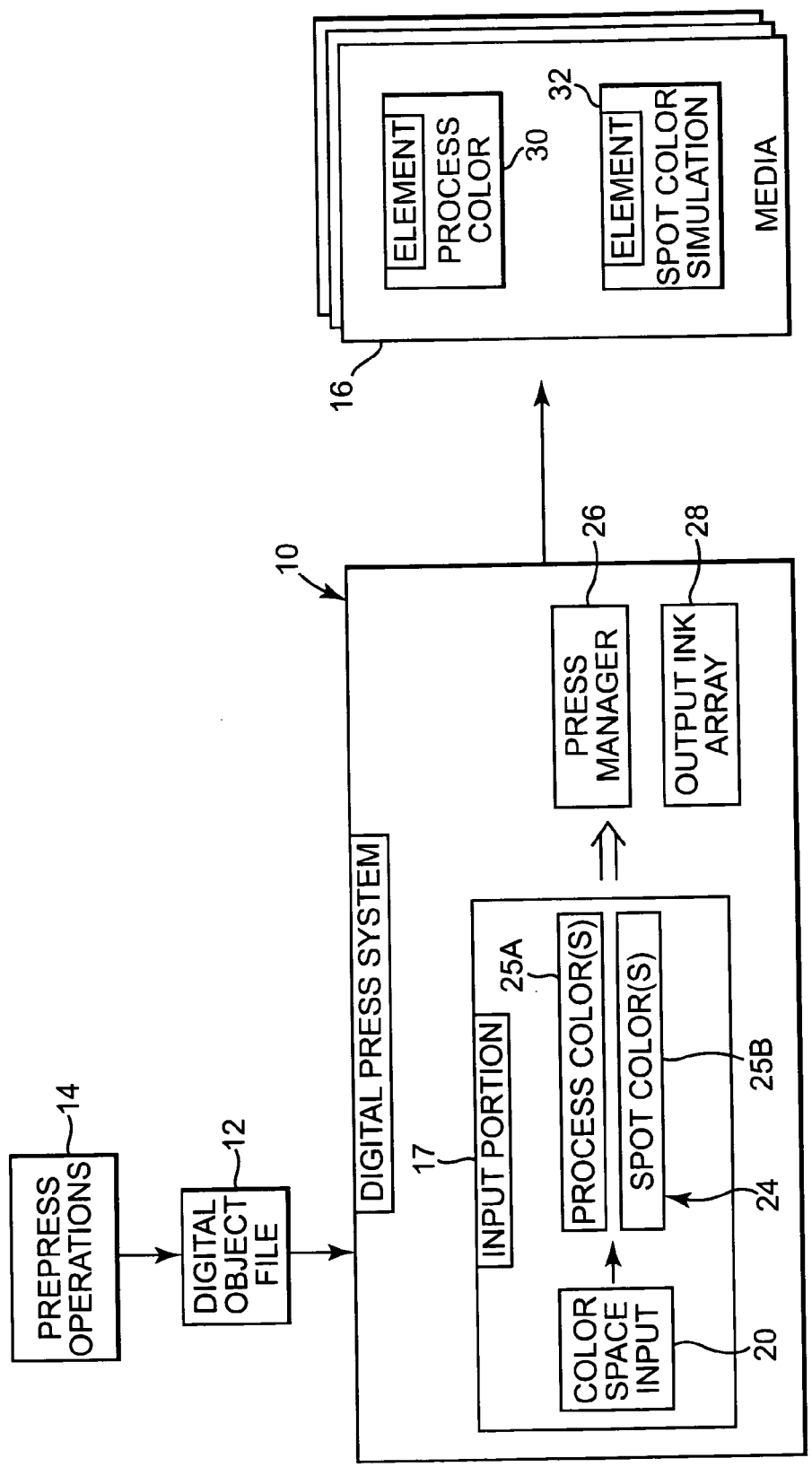
FIG. 1 is a block diagram of a digital press system, according to an embodiment of the present invention.

FIG. 1 is a block diagram of a digital press system 10, according to one embodiment of the invention. As shown in FIG. 1, digital press system 10 receives digital object file 12 from a pre-press operation 14 and produces printed media 16. Printed media 16 comprises process color element 30 and spot color element 32. In one embodiment, digital press system 10 is a digital printing press while in other embodiments, digital press system 10 is a digital offset printing press.

In one embodiment, digital press system 10 comprises, among other components, input portion 17, press manager 26, and output ink array 28. Input portion 17 processes each element within the digital object file 12 to identify various parameters, including color data, to enable digital press system 10 to print each element(s) 30,32 (from the digital object file) on media 16. In one example, input portion 17 comprises a digital front end of a digital press system. In another aspect, input portion 17 includes a raster image processor (RIP) for providing input data to press manager 26, as described more fully in association with press manager 100 of FIG. 2.

In one embodiment, as shown in FIG. 1, input portion 17 of digital press system 10 comprises, among other components, color space input 20 and color designator 24 including a process color(s) designation 25A and a spot color designation 25B. Color space input 20 enables processing digital object file 12 according to a known color space. Accordingly, color space input 20 comprises at least one color space such as a CYMK (cyan, yellow, magenta, black) color space, RGB (red, blue, green) color space, a CIE (Commission Internationale de l'Éclairage) color space, an ICC (International Color Consortium) color space, among other color spaces known in the art.

Color designator 24 enables designation of one or more colors for printing an element of digital object file 12. In one aspect, process color designation 25A enables designating a printable element or a portion of a printable element to be produced using one or more process colors. In another aspect, spot color designation 25B enables designating a printable element or a portion of a printable element to be produced using at least one spot color (e.g., a Pantone® Reflex Blue). In one aspect, the at least one spot color is printed via press manager 26 as an element (e.g., element 32) via a custom color or via a combination of process colors used to simulate the spot color.

Once digital object file 12 has been processed via input portion 17, press manager 26 uses color input data, such as color designations 25A, 25B, to print each element 30, 32 on media 16 using various process color inks (e.g., cyan, magenta, yellow, black, orange, violet, etc.) and/or custom inks (e.g., a spot color ink) available in output ink array 28. Accordingly, press manager 26 enables performing a color separation based on the color input data received from input portion 17, as further described in association with FIG. 2, to produce elements 30, 32 via output ink array 24.

Among other functions, press manager 26 enables adjusting the output of spot color element(s) 32 and/or the output of process color element(s) 30 on media 16. This feature applies in particular to spot color elements produced via press manager 26 as a spot color simulation using a combination of individual process color inks. In one aspect, press manager 26 enables adjusting parameters of a spot color input (e.g., a tone response of the simulated spot color) separate and independent from each individual process color input (e.g., a tone response of each different process color). Accordingly, this adjustment mechanism will enable modifying the output of spot color element 32 on media 16 without affecting the output of process color element 30 on media 16.

These aspects and other aspects of press manager 26 are described more fully in association with FIGS. 2-5.

Figure 2:
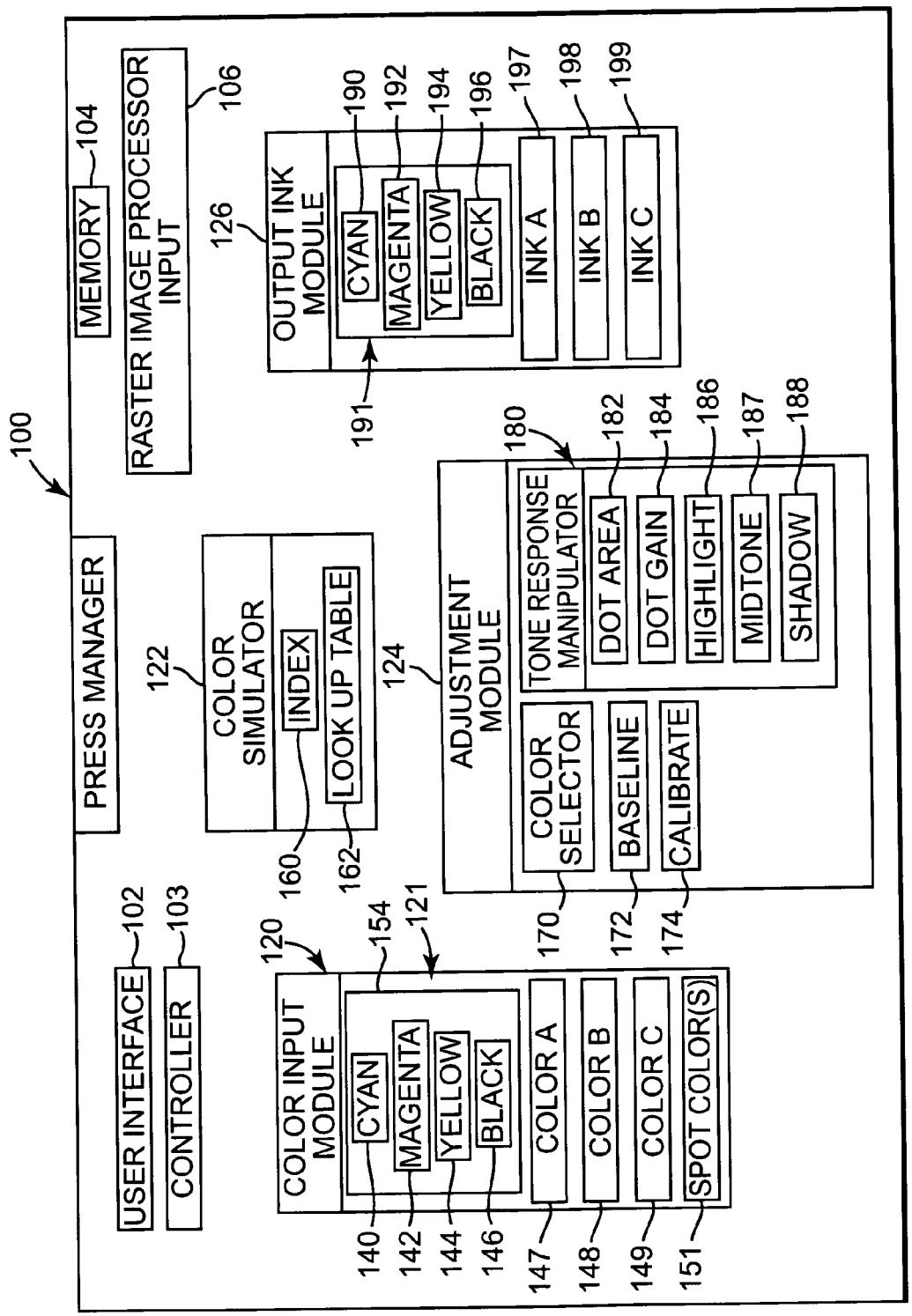
FIG. 2 is a block diagram of a press manager, according to an embodiment of the present invention.

FIG. 2 is a block diagram of a press manager 100, according to an embodiment of the invention. In one embodiment, press manager 100 comprises substantially the same features and attributes of press manager 26 of digital press system 10 (FIG. 1), as well as additional features and attributes described below.

As shown in FIG. 2, in one embodiment press manager 100 of digital press system 10 comprises, among other components, user interface 102, controller 103, memory 104, raster image processor input parameter 106, color input module 120, color gamut simulator 122, adjustment module 124, and output ink module 126.

User interface 102 enables selection and control of the various components, parameters, and modules of press manager 100. Moreover, the various components, parameters, and modules of press manger 100 illustrated in FIG. 2 represent actual functions supported by software, firmware, etc. as well as displayable and selectable features of user interface 102. In one embodiment, user interface 102 comprises a graphical user interface. In another embodiment, user interface 102 comprises a mechanism for receiving and processing an electronically-coded job ticket (e.g. a machine readable paper, card, tag, etc.) that automatically provides input data or an input file for processing by press manager 100 (without an operator's intervention) to select and control the various components, parameters, and modules of press manager 100. In other embodiments, other mechanisms known to those skilled in the art are used to provide input data to press manager 100 to make these selections. Finally, in one embodiment, the parameters and modules of press manager 100 are not strictly limited to the arrangement shown in FIG. 2 and are arrangeable into different combinations to achieve the same functions described herein.

Controller 103 enables operation of press manager 100. In one aspect, a controller 103 enables general control of a digital press (e.g., digital press system 10 of FIG. 1) including operation of press manager 100 while other aspects, controller 103 is adapted for specific implementation of press manager 100.

Memory 104 enables storage of particular values of parameters of press manager 100, as well as storage and operation of press manager 100 itself. Memory 104 comprises an aspect of press manager 100 or forms a portion of a memory generally supporting digital press including the operation of press manager 100.

In one embodiment, raster image processor (RIP) input parameter 106 enables input of information generated by a raster image processor (RIP) of digital press system 10 including identification of which elements in a digital file (to be processed by a digital press) are spot color elements and which elements are process color elements. In one embodiment, this RIP input data is produced by and obtained from input portion 17 of digital press system 10.

Spot color elements are those printable elements comprising spot colors produced from custom inks and/or from process color inks via a spot color simulation. Process color elements are those printable elements comprising non-spot colors produced via process color inks. In one embodiment, the differentiation of spot color elements from process color elements in a digital file, via raster image processor input parameter 106, enables treating adjustments to the output of spot color elements separately from adjustment of the output of process color elements. This differentiation enables adjustments in the appearance (e.g., a tone response) of the spot color elements to be performed without affecting the appearance of the process color elements, and vice versa.

Color input module 120 of press manager 100 enables digital control over input colors that are used to express a color space for printing a digital file as elements on printed media 16. In one embodiment, color input module 120 comprises a color input array 121 of cyan input 140, magenta input 142, yellow input 144, black input 146, color A input 147, color B input 148, and color C input 149. In one aspect, color input array 121 comprises a process color subarray 154 which includes cyan input 140, magenta input 142, yellow input 144, and black input 146. In another aspect, color input A 147 and color input B 148 respectively comprise additional process colors, such as orange and violet, or other process color inks to enable a six process color ink array.

In other embodiments, color input A 147 and/or color input B 148 each comprise a spot color of a color system. In one aspect, these spot colors are capable of being produced by a spot color simulation via process colors (e.g., cyan input 140, magenta input 142, etc.). In another aspect, these spot colors are produced directly via a custom color ink adapted to directly produce the respective spot color. In this aspect, the output of each custom color ink, corresponding to the spot color input 147 and spot color input 148, is represented by the output of ink A 197 and ink B 198.

Color gamut simulator 122, among other functions, directs simulation of a color input such as color A input 147 via a process color ink array, such as the inks in output ink array 28. In one embodiment, color gamut simulator 122 comprises index module 160 and/or look up table (LUT) Module 162. In one aspect, index module 160 stores an array of spot colors available for printing via digital press system 10, such as the spot colors of one of the known color systems (e.g., Munsell, Pantone®, etc.) along with the tint combination of process color inks used to produce each respective spot color. In another aspect, look up table (LUT) Module 162 enables a spot color simulation by storing a table of a specific combination (and tone percentage) of process color inks (e.g., cyan, magenta, etc.) determined to simulate each spot color. Other mechanisms of supplying spot color simulation capability are known in the art.

Output ink module 126 enables monitoring and adjustment of the actual color output on a printable media 16 based on color inputs designated by color input module 120 when printing via inks of output ink array 28. In one embodiment, output ink module 126 comprises output array 191 and enables monitoring and control over the output of each ink in output ink array 28 (FIG. 1). Output array 191 comprises cyan output 190, magenta output 192, yellow output 194, black output 196, ink A output 197, ink B output 198, and custom ink C output 199. Each respective output 190-199 represents the actual measurable and/or perceivable output of each ink of output ink array 28.

In one embodiment, ink A output 197 and ink B output 198 correspond to the output of different process color inks (e.g., orange and violet or other process colors), which are directly driven by color A input 147 and color B input 148. In another embodiment, ink A output 197 and ink B output 198 correspond to the output of process color inks (at color A input 147, color B input 148) which are used in combination with other process color inks to simulate spot colors as driven by spot color(s) input 151. Examples of various spot colors represented by spot color(s) input 151 is described later in association with FIG. 3.

In another embodiment, a digital press comprises an output ink array 28 (FIG. 1) including five process color inks in which color B input 148 of color input module 120 directly corresponds to a spot color and ink B output 198 of output ink module 126 corresponds to a custom ink that produces the spot color designated in color B input 148.

In another embodiment, a digital press comprises an output ink array 28 (FIG. 1) including four process color inks in which color A input 147 of color input module 120 comprises a spot color and directly corresponds to ink A output 197, which represents a custom ink that produces the spot color designated in color A input 147. In addition, in this embodiment, color B input 148 of color input module 120 comprises a spot color and directly corresponds to ink B output 198, which represents a custom ink that produces the spot color designated in color B input 148.

Adjustment module 124 enables adjusting parameters of one or more color inputs in the color input module 120 to modify a corresponding color output on the printable media as expressed via output ink module 126. In one aspect, adjustment module 124 enables adjusting parameters of a spot color input in the color input module 120 to cause a corresponding modification of a spot color output of element 32 on printable media.

In one embodiment, adjustment module 124 comprises color selector 170, baseline parameter 172, calibrate parameter 174 and tone response manipulator 180. In one embodiment, color selector 170 enables selection of one of the color inputs of color input array 121 for adjustment so that each color input (140-151) of color input array is adjustable separately and independent from adjustment of the remaining color inputs. In other words, color input selector 170 enables adjusting one color input at a time without adjusting the other color inputs.

In one embodiment, tone response manipulator 180 comprises dot area parameter 182, dot gain parameter 184, highlight parameter 186, midtone parameter 187, and shadow parameter 188. Accordingly, tone response manipulator 180 of adjustment module 124 enables modification of a color input selected by color input selector 170 to cause a corresponding change in the output of that selected color input as expressed on printable media by output ink module 126 via color gamut simulator 122.

A primary mechanism by which tone response manipulator 180 operates is by enabling selection of a dot area to be printed (via dot area parameter 182) for a given color input, such as a spot color input. This selection is made in the context of a baseline tone response for that color (associated with baseline parameter 172) and in the context of a dot gain determined based upon an evaluation of the current color output produced by digital press system 10. A dot gain parameter 184 of tone response manipulator 180 enables display of this dot gain evaluation, as well as enabling an increase or decrease in the requested area dot area based on the measured dot gain.

Dot gain commonly refers to a change in diameter or the size of a halftone dot as printed on a media relative to the intended diameter of the dot, which is commonly known as the dot area. In short, dot gain refers to the phenomenon in which a dot as printed on a medium becomes larger than (or alternatively, smaller than) intended. Various factors affect dot gain including whether the requested dot is a highlight, midtone, or shadow, as well as variables of the digital press including plate temperature, type of ink, ink temperature, exposure time, or type of media, etc. This list of factors is not exhaustive, but serves to illustrate the multidimensional challenge affecting control of dot gain. Because of this complexity, digital press system 10 is calibrated via calibrate parameter 174 of press manager 100 according to its actual performance to establish a tone response curve that maps out a dot gain profile for each color input relative to its color output. This calibration includes printing an element on a media and then electronically measuring the actual color, size, pattern, etc, of the printed media using tools such as a densitometer, to determine the dot gain for each color input.

Figure 4:
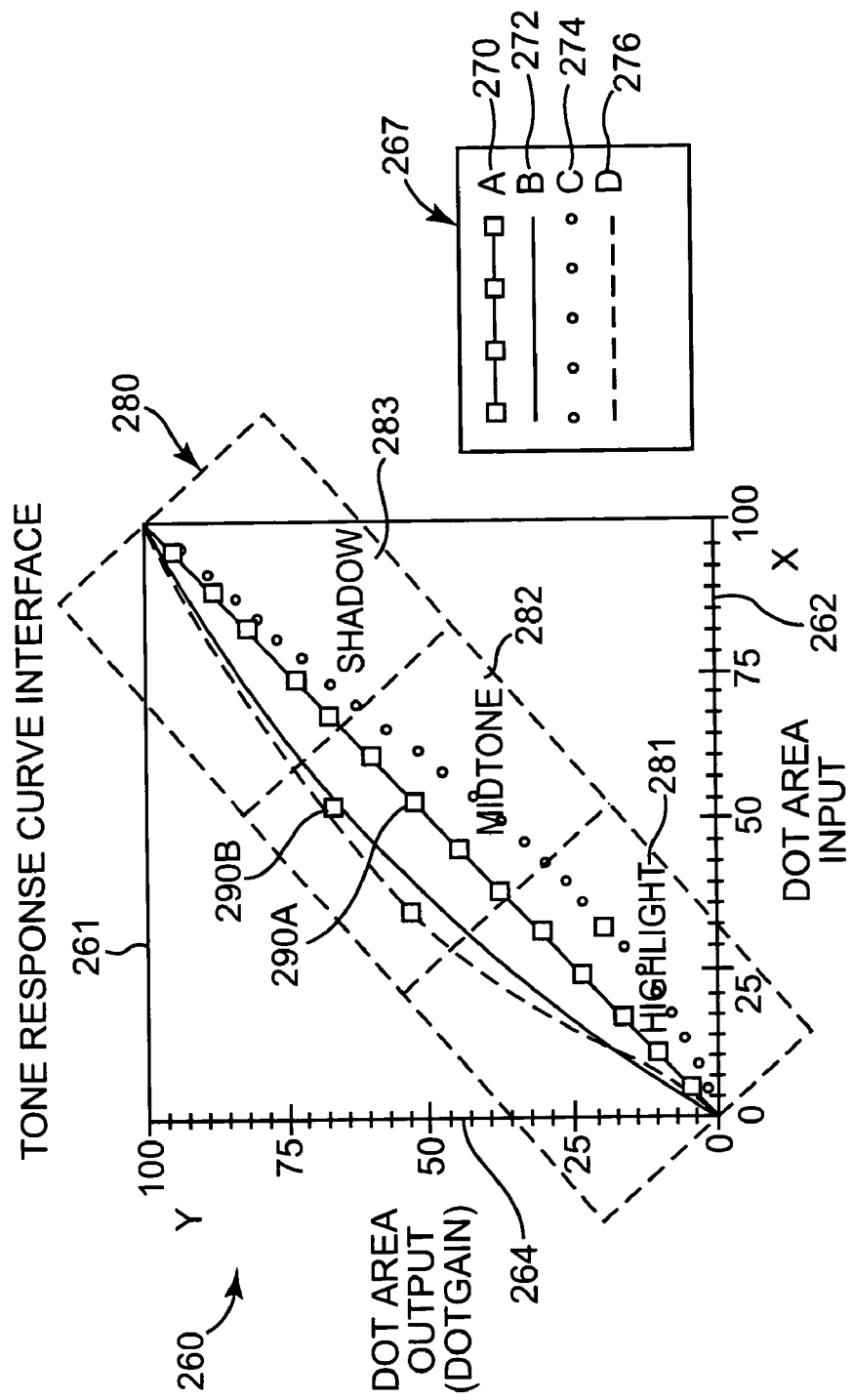
FIG. 4 is an illustration of a tone response curve interface, according to an embodiment of the present invention.

In one aspect, adjustment module 124 enables display and manipulation of a tone response curve for each color input/output via user interface 102, as illustrated in FIG. 4, which will be later described in detail.

Because dot gain varies based on several factors, such as tint range, the tone response manipulator 180 also enables identifying which aspect of the tint will be adjusted. The tint can be adjusted along a full range from 0% to 100%. However, tint is commonly described in ranges including a highlight range, midtone range, and a shadow range, each of which typically corresponds to an aspect of a printed element, such as a logo or photo. For example, a lighter tinted portion of a logo is typically referred to as a highlight while a darker portion of a logo is typically referred to as a shadow, with moderately tinted portions being typically referred to as midtones. Because characteristics of ink printing (e.g., dot gain) also vary slightly in general correspondence to whether the printing occurs in the highlight tint range, the midtone tint range or the shadow tint range, operators generally adjust color inputs and outputs with reference to these non-limiting tint ranges.

Accordingly, in one aspect, via highlight parameter 186 of tone response manipulator 180, one can increase or decrease an expected dot area print in a highlight range of the tone response curve of a specific color input. Likewise, via midtone parameter 187 of tone response manipulator 180, one can increase or decrease an expected dot area print in a midtone range of the tone response curve of a specific color input. Finally, via shadow parameter 188 of tone response manipulator 180, one can increase or decrease an expected dot area print in a shadow range of the tone response curve of a specific color input. These tint range parameters 186-188 are further illustrated in association with FIG. 4.

However, in one aspect, adjustments to a tone response curve are made without reference to the highlight parameter 186, midtone parameter 187, shadow parameter 188 by simply making an adjustment along the 0 to 100% tint range.

Figure 3:
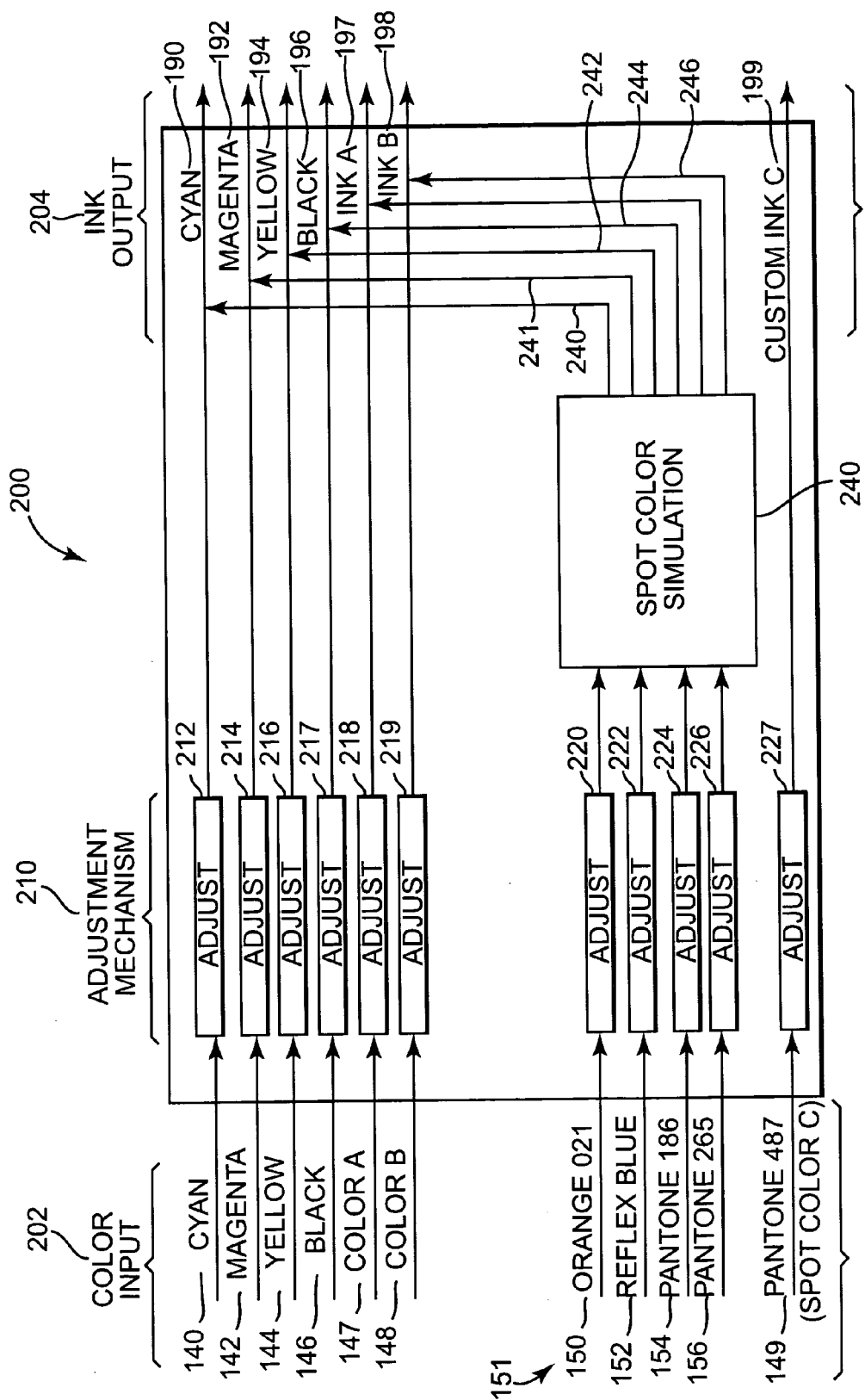
FIG. 3 is an illustration depicting operation of a press manager of a digital press, according to an embodiment of the present invention.

FIG. 3 is a diagram illustrating aspects of the operation of press manager 100, according to one embodiment of the invention. As shown in FIG. 3, operation 200 includes color input 202, ink output 204, adjustment mechanism 210, and spot color simulation 240. Color input 202 generally corresponds to the color inputs (140-151) of color input module 120 of press manager 100 (FIG. 2). Ink output 204 comprises the output of color inks (190-199) represented by output ink module 126 of press manager 100 (FIG. 2), and the actual inks of output ink array 28 (FIG. 1).

In one embodiment, spot color input 151 (FIG. 2) comprises spot color inputs 150-156. Each color input 150-156 of color input module 120 comprises a spot color of a color system. In one aspect, color inputs 150-156 comprise Orange 021 color input 150, Reflex Blue color input 152, Pantone® 186 color input 154, and Pantone® 265 color input 156. However, in another aspect, color inputs 150-156 comprise other spot colors of the Pantone® Matching System or another color system. As previously described, each of these spot colors is capable of being produced by a spot color simulation via two or more process color inputs 140-148.

In another embodiment, spot color input C 149 comprises a spot color of a color system. In one aspect, spot color input C 149 comprises a PANTONE® 487 spot color while in other aspects, spot color input C 149 comprises another spot color from the PANTONE® system or other color systems. This spot color is produced directly via a custom color ink of output ink array 28 (FIG. 1) adapted specially to directly produce the spot color. As shown in FIG. 2, the output of this custom color ink is represented by custom ink C 199 of output ink module 126. As shown later in FIG. 3, the output of custom ink C 199 is produced without a spot color simulation 240.

Adjustment mechanism 210 generally corresponds to at least one function of adjustment module 124 of press manager 100 (FIG. 2). In one aspect, adjustment mechanism 210 comprises separate and independent adjustment pathways (212-227) for adjusting each respective color input (140-156) separately from each other. In one example, adjustment of spot color input 154 (e.g., Pantone® 186) is performed via adjustment pathway 224, which is independent and separate of any of the process color inputs (e.g., cyan color input 140, magenta color input 142, yellow color input 144, black color input 146, color A input 147, and color B input 148).

In one aspect, adjustment pathways 212-227 do not represent actual physical pathways or channels but instead represent the function of color selector 170 of adjustment module 124 (FIG. 2) to adjust one color input separately from adjusting other color inputs. Accordingly, as shown in FIG. 3, an adjustment of color input 154 (e.g., Pantone® 186) is carried into spot color simulation 240, and then expressed via execution pathways (240-246) by output inks 190-198, respectively. The adjustment to color input 154, which causes an adjustment (via spot color simulation 240) of a quantity of one or more output inks 190-198 when printing spot color input 154 on a media, does not change the output of those output inks 190-198 when one or more of the color inputs (140-148) is printed as a process color output.

Accordingly, the output of process color inks on a printable media is not affected by adjustments to the output of spot colors simulated by process color inks.

In another aspect, color C input 149 corresponds to a spot color that is printed on a media via a custom ink, as represented by ink C 199, without simulation by any process inks. Accordingly, adjustment of color C input 149 via adjustment channel 227 to modify a color output of custom ink C 199 also is independent from adjustment of spot color inputs 150-156 and/or from process color inputs 140-148.

In another aspect, operation 200 and adjustment mechanism 210 of FIG. 3 is not strictly limited to the use of six inks as process inks and instead applies to independently adjusting any number of process color inputs (e.g., more or less than six) separately from adjustment of spot color inputs.

FIG. 4 is an illustration of a tone response curve interface 260, according to one embodiment of the invention. As shown in FIG. 4, a display 261 comprises an input (x) axis 262 corresponding to a dot area input and an output (y) axis 264 corresponding to a dot area output (representing dot gain) upon an attempt by a digital press to print the intended dot area on a media. A number of tone response curves 270-276 (as labeled in legend 267), each corresponding to a different spot color or process color, are displayed on display 261. The display 261 comprises a tint range 280 which is generally divided into three non-limiting ranges including a highlight range 281, a midtone range 282, and a shadow range 283.

In one aspect, tone response curve interface 260 illustrates a tone response curve for spot colors which are adjusted to achieve a desired output, while accounting for dot gain. The tone response curve of a spot color represents an input of a single spot color and a corresponding dot area output produced via a spot color simulation by an output ink array of four or more (e.g., six) process colors.

The dot area output and associated dot gain for each color input is determined by electronic evaluation via the digital press to construct a tone response curve for each color input. A baseline curve A (270) represents a baseline in which a dot area input (e.g., 50%) equals a dot area output (e.g., 50%). Each color is mapped on display 261 according to its dot gain for each corresponding input. For example, curve B (272) represents a spot color that has a dot gain of 15% in a midtone range 282. This dot gain corresponds to a dot area output of 65% (shown at 290B) produced by a dot area input of 50% (shown at 290A). With this information, a digital press operator can selectively adjust the dot area input to a lower value, such as 45%, to produce an expected dot area output of 60% (or close to 60%) to achieve a desired tint in the color output on the media. However, a change in the dot area input does not necessarily result in a directly equivalent change in the dot gain. In one aspect, this example adjustment effectively moves the tone response curve downward. Other values for the tone response of that color input/output are interpolated to construct a smooth curve over the full 0 to 100% tint range while including the manipulated input point.

As previously described, an adjustment of the single spot color input (and its tone response curve) does not affect a tone response curve of the process color(s) because the manipulation of the spot color input occurs before a spot color simulation (by color gamut simulator 122 (FIG. 2)). Accordingly, adjusting a tone response curve (272) for a spot color does not affect a tone response curve for a process color such as process color curve D (276).

Figure 5:
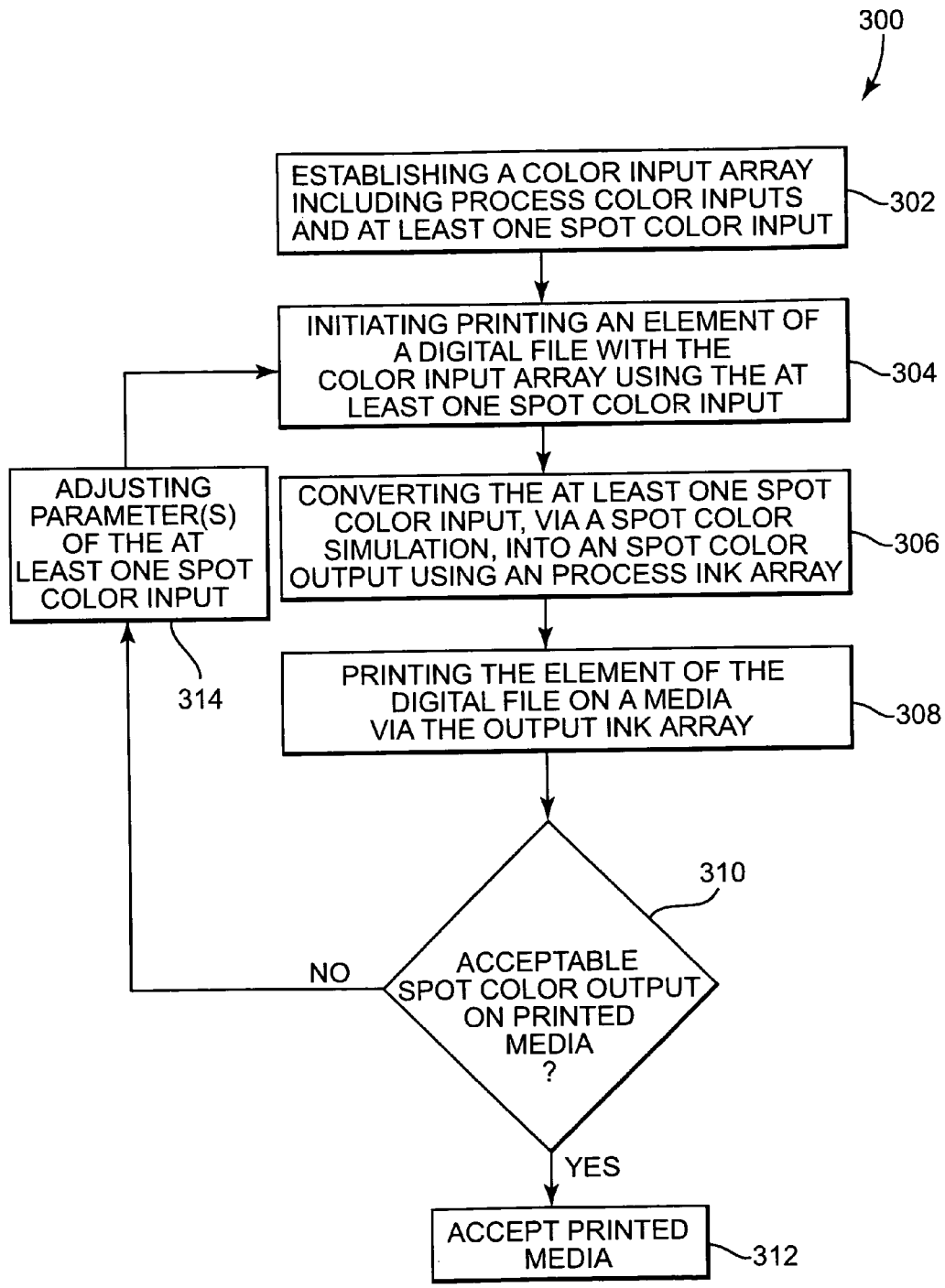
FIG. 5 is a flow diagram of a method of digital printing, according to an embodiment of the present invention.

FIG. 5 is a flow diagram of a method 300 of digital printing, according to one embodiment of the invention. In one embodiment, method 300 is performed using digital press system 10 (and/or press managers 26,100) as described in association with FIGS. 1-4, while in other embodiments, method 300 is performed with other systems and components.

As shown in FIG. 5, at 302 method 300 comprises establishing a color input array including process color inputs and at least one spot color input. In one aspect, process color inputs include cyan, magenta, yellow and black, as well as orange, violet, and other process colors. In another aspect, spot color inputs include spot colors of a color matching system.

At 304, printing an element of a digital file is initiated with the color input array using the at least one spot color input. In one aspect, the digital file (e.g., a PDF file or Postscript file) is manipulated by a raster image process to separately identify elements to be printed with spot colors (i.e., spot color elements) from elements to be printed with non-spot process colors (i.e., process color elements). In one aspect, the at least one spot color input typically is a spot color of a color matching system used to print a logo or graphic requiring a specific and exact reproduction of that spot color each time the logo is printed.

At 306, the at least one spot color input is converted, via a spot color simulation, into a spot color output using an output ink array. In one aspect, a combination of one or more process color inks, such as cyan, magenta, yellow, and black inks are used to print the at least one spot color based upon the conversion instructions from a spot color simulation. In one aspect, additional color inks such as orange and/or violet (or other colors) are also used as process color inks to print the at least one color gamut simulated spot color.

At 308, the digital file is printed as a spot color element on a media via the output ink array. At 310, an operator determines whether the spot color output on the printed media is acceptable. In one aspect, the determination is made manually while in another aspect, the determination is made electronically as a function of the digital press. If the spot color output is accepted, then at 312 the printed media is accepted to complete the job and/or additional copies of the printed media are printed.

If the spot color output is not acceptable, than at 314 parameter(s) of the at least one spot color input are adjusted prior to initiating printing the digital file again at 304. The adjustment is made in the profile or tone response curve of the spot color input separate from the profile (e.g., tone response curve) of each of the other process color inputs prior to the spot color simulation for expression into output inks. This adjustment sequence insures that the adjustment of the spot color output to print spot color elements on a media does not affect the output of the process color inks as used to print process color elements.

Embodiments of the present invention are directed to adjusting the output of spot colors printed by a digital press by modifying an input profile of the spot color separate from an input profile of process color inputs, which are used to simulate the spot color via process color inks by a spot color simulation. The adjustment is made prior to performing the spot color simulation. This arrangement enables an operator of a digital press to make adjustments in elements of a printed media at the digital press, without resorting to adjustments in pre-press operations, and while preventing the change in the output of the spot color elements of a printed media from affecting the output of process color elements on the same printed media.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for adjusting color output in a digital press, the method comprising:

providing a digital press including an output array of process color inks configured to print a simulated spot color element on a media and including an input color array including a subarray of process color inputs and at least one spot color input;

printing the simulated spot color element on the media from a simulated spot color output of the digital press via a spot color simulation of the at least one spot color input using the output array of process color inks;

based on an observation of the printed simulated spot color element, adjusting the simulated spot color output by modifying, at the digital press, a tone response curve of the at least one spot color input without adjusting a tone response curve of each respective process color input.

2. The method of claim 1 wherein the subarray of process color inputs comprises a cyan color input, a magenta color input, a yellow color input, a black color input and the output array of process color inks comprises a cyan ink, a magenta ink, a yellow ink, a black ink, a fifth color ink, and a sixth color ink.

3. The method of claim 2 wherein the fifth color ink of the output array comprises an orange ink and the sixth color ink of the output array comprises a violet ink.

4. The method of claim 1 wherein adjusting the simulated spot color output comprises:

identifying, via raster image processing, the simulated spot color element separately from a second process color element in the digital file.

5. The method of claim 1 wherein modifying the tone response curve comprises modifying the intended printable dot area of the at least one spot color input relative to a baseline dot gain of the simulated spot color element.

6. The method of claim 1 wherein adjusting the simulated spot color output comprises:

performing the modification of the tone response curve of the at least one spot color input prior to performing the spot color simulation.

7. The method of claim 1 wherein adjusting the simulated spot color output comprises:

modifying the tone response curve of the at least one spot color input, based upon a measured dot gain of the simulated spot color element on the media, within at least one of a highlight region, a midtone region, and a shadow region of the tone response curve of the at least one spot color input without affecting the tone response curve of the respective process color inputs.

8. The method of claim 1, wherein printing the simulated spot color element on the media from a simulated spot color output of the digital press via a spot color simulation of the at least one spot color input comprises:

performing the spot color simulation via exclusively using the output array of process color inks.

9. A method of printing comprising:
   providing a digital press including an output color ink array including cyan ink, magenta ink, yellow ink, black ink, a fifth color ink, and a sixth color ink, wherein at least the respective cyan, magenta, yellow, and black inks are process color inks;
   providing an input color array of the digital press including a cyan color input, a magenta color input, a yellow color input, a black color input, and at least one spot color input, wherein the respective cyan, magenta, yellow, and black color inputs are process color inputs;
   printing, via the digital press, a first simulated spot color element on a first media from a digital file including printing the at least one spot color input as a first simulated spot color output in the first simulated spot color element on the media via a spot color simulation exclusively using at least the respective process inks of the output color ink array;
   adjusting the first simulated spot color output by modifying, at the digital press, a tone response curve of the at least one spot color input independent of an adjustment of a tone response curve of one or more of the respective process color inputs; and
   printing, via the digital press, a second simulated spot color element on a second media from the digital object file including printing the modified at least one spot color input as a second simulated spot color output in the second simulated spot color element on the second media via the spot color simulation exclusively using the respective process color inks of the output color ink array.

10. The method of claim 9 wherein printing the first simulated spot color element on a media comprises:
    printing at least one process color element on the media via the cyan color input, magenta color input, yellow color input, and black color input separate from printing the first simulated spot color element via the at least one spot color input.

11. The method of claim 10 wherein printing the first simulated spot color element on a media comprises:
    identifying, prior to printing, the first simulated spot color element separately from the at least one process color element via a raster image process to enable adjusting the first spot color output.

12. The method of claim 9 wherein in adjusting the first simulated spot color output, modifying the tone response curve of the at least one spot color input comprises:
    adjusting an intended printable dot area relative to a measured dot gain of the tone response curve prior to operation of the spot color simulation during printing of the second simulated spot color element.

13. The method of claim 9 wherein modifying the tone response curve of the at least one spot color input comprises:
    separately modifying each of a highlight region, a midtone region, and a shadow region of the tone response curve.

14. A digital press comprising:
    a printing mechanism configured for printing an element of a digital file on a media and including an output ink array of at least a plurality of process color inks; and
    a color manager including:
       a color input module including an input array of process color inputs and at least one spot color input;
       a color simulator configured to perform a spot color simulation to enable printing, via the respective process color inks of the output ink array, at least one simulated spot color output in the element on the media that corresponds to the at least one spot color input; and
       an adjustment mechanism configured to adjust the at least one simulated spot color output by adjusting a tone response curve of the at least spot color input, separate from adjusting a tone response curve of the respective process color inputs, prior to operation of the spot color simulation by the color simulator.

15. The digital press of claim 14 wherein the adjustment mechanism comprises:
    a tone response manipulator comprising a dot area parameter configured to modify an intended printable dot area of the at least one spot color input relative to and a measured dot gain parameter to enable modifying the tone response curve of the at least one spot color input; and
    a baseline parameter to enable establishing, a baseline dot gain for the digital press, prior to adjusting the tone response curve.

16. The digital press of claim 15 wherein the adjustment mechanism comprises:
    a color selector configured to enable selecting a respective one of the process color inputs, in addition to the at least one spot color input, for modification by the adjustment mechanism, wherein the tone response manipulator enables adjusting the tone response curve of the respective process color inputs without affecting the tone response curve of the at least one spot color input.

17. The digital press of claim 14 wherein the color manager comprises:
    a raster image process input parameter to enable identifying the element as a spot color element separately from at least one process color element of the digital file.

18. A digital press comprising:
    means for printing, exclusively via an array of output process color inks, at least one simulated spot color element on a media from a digital file; and
    means for adjusting a color parameter of the at least one simulated spot color element via modifying a tone response curve of at least one spot color input, separate from a tone response curve of an array of process color inputs, prior to a spot color simulation of the at least one spot color input via the respective process color inputs and the respective process color inks.

19. The digital press of claim 18 wherein the means for adjusting a color parameter comprises:
    a tone response manipulator including a first adjustment pathway and a second adjustment pathway, and being configured to adjust the tone response curve of the at least one spot color input via the first adjustment pathway independent and separate from the second adjustment pathway, wherein the second adjustment pathway is configured to adjust the tone response curve of the respective process color inputs.

20. The digital press of claim 19 wherein the tone response manipulator enables modifying an intended dot area associated with the at least one spot color input based on a measured dot gain of the color parameter of the at least one simulated spot color element.

* * * * *

UNITED STATES PATENT AND TRADEMARK OFFICE
CERTIFICATE OF CORRECTION

| | | |
|---|---|---|
| PATENT NO. | : 7,791,776 B2 | |
| APPLICATION NO. | : 11/261090 | |
| DATED | : September 7, 2010 | |
| INVENTOR(S) | : Mary Nielsen et al. | |

It is certified that error appears in the above-identified patent and that said Letters Patent is hereby corrected as shown below:

In column 11, line 17, in Claim 9, after "using" delete "at least".

In column 12, line 19, in Claim 15, delete "establishing," and insert -- establishing --, therefor.

Signed and Sealed this
First Day of March, 2011

David J. Kappos
*Director of the United States Patent and Trademark Office*